(12) United States Patent
Froc et al.

(10) Patent No.: US 7,684,500 B2
(45) Date of Patent: Mar. 23, 2010

(54) METHOD FOR DETECTING UWB PULSE SEQUENCES IN A COST-EFFICIENT MANNER

(75) Inventors: Gwillerm Froc, Rennes Cedex (FR); Stephane Paquelet, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 977 days.

(21) Appl. No.: 11/366,400

(22) Filed: Mar. 3, 2006

(65) Prior Publication Data

US 2006/0203902 A1     Sep. 14, 2006

(30) Foreign Application Priority Data

Mar. 7, 2005     (EP) .................................. 05290511

(51) Int. Cl.
*H04L 27/00*    (2006.01)
(52) U.S. Cl. .................. 375/259; 375/132; 375/135; 375/256; 375/267; 375/295; 370/208; 370/319; 455/102; 455/522; 455/574
(58) Field of Classification Search ................. 375/130, 375/135, 136, 145, 146, 256, 260, 287, 295, 375/316, 132, 316.342, 343, 354, 259; 370/203, 370/294, 464, 483; 455/101, 102, 522, 574
See application file for complete search history.

(56) References Cited

U.S. PATENT DOCUMENTS

| 6,788,730 | B1 | 9/2004 | Richards et al. |
| 7,292,656 | B2 * | 11/2007 | Kloper et al. ................ 375/340 |
| 2004/0171957 | A1 * | 9/2004 | Farserotu et al. ............. 600/509 |
| 2005/0031043 | A1 * | 2/2005 | Paquelet ..................... 375/259 |
| 2005/0206446 | A1 * | 9/2005 | Shimazaki et al. ........... 329/313 |
| 2006/0188007 | A1 * | 8/2006 | Daneshrad et al. .......... 375/148 |
| 2008/0285663 | A1 * | 11/2008 | Fischer ....................... 375/259 |
| 2009/0245390 | A1 * | 10/2009 | Kim et al. .............. 375/240.26 |

FOREIGN PATENT DOCUMENTS

EP     0 682 425 A3    11/1995

OTHER PUBLICATIONS

U.S. Appl. No. 11/366,407, filed Mar. 3, 2006, Froc.

* cited by examiner

*Primary Examiner*—Shuwang Liu
*Assistant Examiner*—Hirdepal Singh
(74) *Attorney, Agent, or Firm*—Oblon, Spivak, McClelland, Maier & Neustadt, L.L.P.

(57) ABSTRACT

A method for transmitting data in the form of at least one pulse sequence included in a transmitted signal. The method includes calculating at least one detection value representative of an amount of power carried by the pulse sequence by performing integration over a tunable time duration, and comparing the detection value to at least one predetermined threshold value.

5 Claims, 4 Drawing Sheets

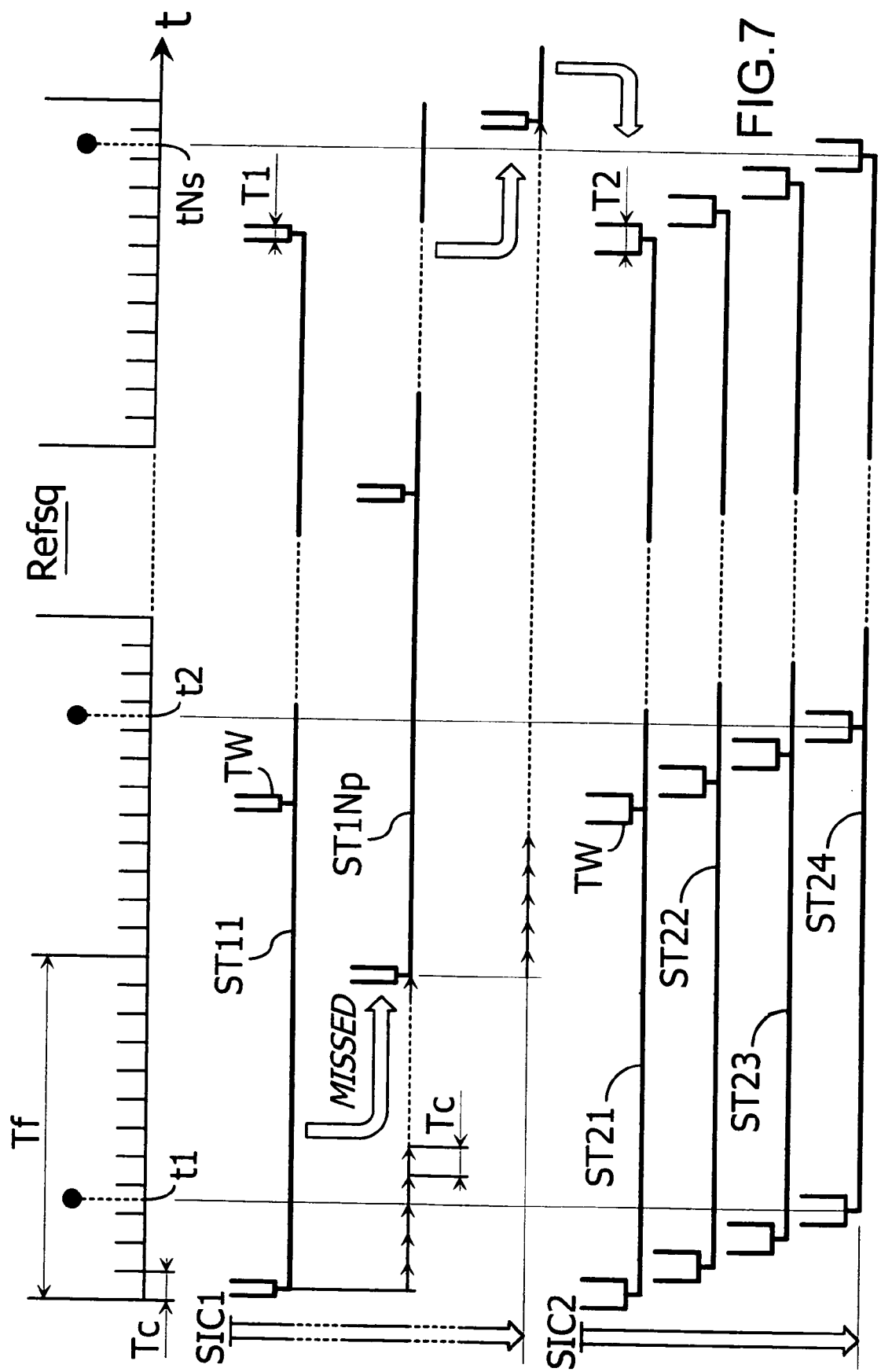

METHOD FOR DETECTING UWB PULSE SEQUENCES IN A COST-EFFICIENT MANNER

FIELD OF THE INVENTION

The present invention relates to a method for transmitting data in a telecommunication system including at least one transmitter and one receiver, said transmitter being intended to transmit a carrying signal formed by at least one reference sequence including a predetermined number of pulses dispatched over a same predetermined number of time windows, each pulse of the reference sequence being enclosed within a time chip whose position whithin its relevant time window is defined by a chip number.

DESCRIPTION OF RELATED ART

Such data transmission methods are currently studied with the aim of assessing the relevance of so-called Ultra-Wide Band telecommunication systems (further referred to as UWB systems). In such a system, each transmitter may be identified by a signature formed by the above-mentioned chip numbers, which signature is in itself quite sturdy and may thus be reliably and accurately communicated to all potential receivers.

The pulses used in UWB systems are very short, having for example a duration lower than 0.1 nanosecond, which offers to such systems bandwidths at least as large as 10 GigaHertz, entailing high flexibility and hence numerous possible applications for such systems.

Information can be encoded and transmitted by performing a modulation of the above-described carrying signal. The inventors have observed that, because of the shortness of the pulses involved, a precise synchronization with a given pulse sequence will be difficult to perform at the receiver end, so that a detection scheme involving as few time-related parameters as possible should be used for detecting a transmitted signal, in order for said detection scheme to be cost-efficient.

BRIEF SUMMARY OF THE INVENTION

The present invention thus aims at providing an UWB telecommunication system with a realistic and efficient detection scheme, according to which scheme information carried by pulse sequences may be identified as such at the receiver end without said receiver having to map precisely, with respect to time, the received pulse sequences, and, more generally, by spending as little time and processing power as possible for performing the detection of a received signal.

Indeed, a method for transmitting data as described in the opening paragraph is characterized according to the invention in that it includes at least one signal detection step to be executed at the receiver end, in the course of which signal detection step at least one detection value representative of an amount of power carried by a received signal is computed and compared to at least one predetermined threshold value, said detection value being computed by integrating the received signal over a time duration which is tunable.

The signal detection step according to the invention enables to differentiate a signal actually transmitted from noise generally affecting any given communication channel, by quantifying the power of the received signal and performing simple comparisons with one or several threshold values, which comparisons are easy to implement. Such a detection scheme does not require the receiver to perform a precise mapping, with respect to time, of the received signal, which in turn enables to manufacture adapted receivers at a relatively low cost.

Furthermore, since the physical property to be used for detecting an actually transmitted signal is a quantity of energy carried by said signal, as perceived at the receiver end, the inventors have observed that physical phenomena affecting a wireless link established between a transmitter and a receiver will have an impact on the receiver's ability to detect incoming information. A link featuring a strong noise or a long distance will most certainly produce a significant attenuation and/or distorsion of the signal transmitted through it, which means that the energy carried by said signal will be more difficult to detect and quantify than that carried by a signal transmitted through a low-noise, short distance channel, and will thus require the use of a longer integration time in accordance with the present invention. The fact that the time duration over which the received signal will be integrated may be tuned will enable to optimize this duration with respect to any current configuration of the telecommunication system. This time duration may for example be initially set at a relatively small value and be increased if a distance separating the transmitter and the receiver widens, whereas using a single and constant time duration for performing the above-described integration would command to select a large, worst-case value for said duration, which would then also be used even if the transmitter and the receiver were close to each other, thus leading to longer computations and unnecessary spending of processing power.

Several embodiments have been designed by the inventors for tuning the duration over which the received signal is to be integrated:

According to a first variant of the invention, the detection value is computed by integrating the received signal over at least one detection pattern including a tunable number of time windows.

Integrating the received signal over a preselected series of time windows as defined by the detection pattern enables to restrict the use of computing power for detection and demodulation purposes to those instants encompassed by the specific time windows forming the detection pattern, which specific time windows are picked up among those identified as suitable by the signature of the original transmitter which has been communicated beforehand to the receiver.

In a particular embodiment of this first variant, the detection value will be computed by integrating the received signal over successive detection patterns, each of which including a series of time windows whose respective positions are defined by chip numbers associated with an expected reference sequence, the number of time windows being increased, from a given detection pattern to the next one, until a resulting detection value exceeds the predetermined threshold value.

This embodiment of the invention enables to start from a best-case situation hypothesis, for which only a comparatively small integration duration would be sufficient for performing a detection of a transmitted signal, and to progressively move towards worse-case scenarii for which the overall integration duration will be gradually increased until a detection is actually achieved or considered impossible because of a lack of signal.

A new value of the number of the time windows to be included in a new detection pattern will for example be obtained on the basis of a former value by incrementing said former value by a predetermined quantity, or by multiplying said former value by a predetermined quantity, which predetermined quantity may itself be dynamically tunable in some specific embodiments.

In a preferred embodiment of this first variant, the detection value will be computed by selecting an initial number of time windows for constituting an initial detection pattern and performing an initial cycle of successive integrations of the received signal over successive time-shifted detection patterns, each integration being followed by a comparison of the resulting detection value with the predetermined threshold value, said cycle being carried out until a detection value is found higher than said predetermined threshold value, or until all possible beginnings of a transmitted pulse sequence will have been covered by each first window of each time-shifted detection pattern, in which case the number of the time windows to be included in the detection pattern is increased and a new cycle of successive integrations is performed.

As will be made apparent hereinafter, such a preferred embodiment is simple to implement and will thus provide an interesting cost-efficiency ratio.

According to a second variant of the invention, which may be used alternatively or cumulatively with the first variant described hereinbefore, the detection value is computed by integrating the received signal over at least one series of time windows whose respective positions are defined by chip numbers of an expected reference sequence, said time windows having a width which is tunable.

For this second variant also, integrating the received signal over a preselected series of time windows enables to restrict the use of computing power for detection and demodulation purposes to those instants where pulses are actually expected, as indicated by the signature of the original transmitter which has been communicated beforehand to the receiver. The possible tuning of the width of the time windows furthermore allows to optimize the overall integration duration with respect to any current configuration of the telecommunication system, particularly in embodiments where this second variant is not used together with the first one, and in which the signature hence determines unchangeable relative positions of different integration time intervals forming the time windows.

According to a preferred embodiment of this second variant of the invention, the width of said time windows is adapted by choosing an initial setting for said width and performing a first cycle of successive integrations of the received signal over successive shifted series of time windows, until a detection value is found higher than a predetermined threshold value, or until all possible beginnings of a reference pulse sequence will have been covered by each first window of each series, in which case the value of the width of said time windows is increased and a new cycle of successive integrations is performed.

A new value of the width of the time windows will for example be obtained on the basis of a former value by incrementing said former value by a predetermined quantity, or by multiplying said former value by a predermined quantity.

A monitoring of the number of changes applied to the detection patterns to be used in the above-described first and/or second variants of the invention may optionnally be performed, so as to stop and/or re-initialize the execution of the signal detection step once a given maximal number of changes will have been reached, which maximal number may itself be dynamically tunable.

According to one of its hardware-oriented aspects, the invention also relates to a telecommunication system including at least one transmitter and one receiver, said transmitter being intended to transmit a carrying signal formed by at least one reference sequence including a predetermined number of pulses dispatched over a same predetermined number of time windows, each pulse of the reference sequence being enclosed within a time chip whose position whithin its relevant time window is defined by a chip number, system in which the receiver includes signal detection means intended to compute at least one detection value representative of an amount of power carried by each pulse sequence and to compare said detection value to at least one predetermined threshold value, said detection value being computed by integrating the received signal over a time duration which is tunable.

According to another of its hardware-oriented aspects, the invention also relates to a device intended to receive a signal formed by at least one reference sequence including a predetermined number of pulses dispatched over a same predetermined number of time windows, each pulse of the reference sequence being enclosed within a time chip whose position whithin its relevant time window is defined by a chip number, which device includes signal detection means intended to compute at least one detection value representative of an amount of power carried by each pulse sequence and to compare said detection value to at least one predetermined threshold value, said detection value being computed by integrating the received signal over a time duration which is tunable.

BRIEF DESCRIPTION OF THE SEVERAL VIEWS OF THE DRAWINGS

The characteristics of the invention mentioned above, as well as others, will emerge more clearly from a reading of the following description given in relation to the accompanying figures, amongst which:

FIG. 7 is a series of chronograms depicting an embodiment of an automatic tuning step intended to adjust a time duration during which an integration of a received signal is to be carried out according to a second variant of the invention.

DETAILED DESCRIPTION OF THE INVENTION

Figure 1:
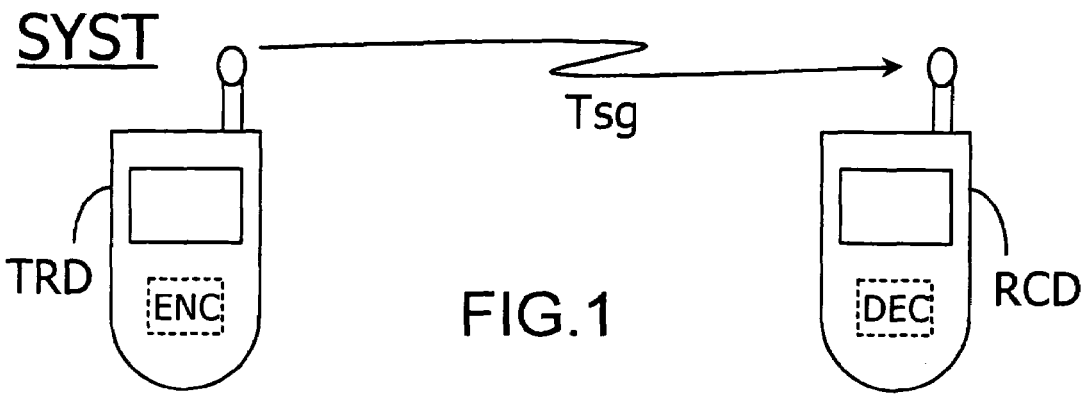
FIG. 1 is a functional diagram depicting a telecommunication system in which the invention is used.

FIG. 1 depicts a telecommunication system SYST in which the present invention is embodied. This system SYST includes at least one transmitter TRD and one receiver RCD, which may for example be both constituted by devices such as mobile phones. The transmitter TRD is intended to transmit a signal Tsg formed by at least one sequence of Ns pulses pj (for j=1 to Ns) over Ns time windows, each pulse being enclosed within a time chip whose position whithin its relevant time window is defined by a chip number cj (for j=1 to Ns). The number Ns of pulses included in this sequence may, for example, be chosen equal to 128, while the width of each time window may be chosen equal to 100 nanoseconds, with a width of 1 nanosecond for each time chip.

According to the particular embodiment of the present invention which will be described hereinafter, the transmitter TRD includes symbol encoding means ENC intended to multiply each pulse sequence by an integer value representative of a symbol to be carried by said pulse sequence, in order to perform an amplitude modulation of said pulse sequence.

The information carried by the transmitted signal Tsg will thus essentially be related to the power carried by this signal Tsg, which power is related to the amplitude of the pulses included within said signal Tsg. This information may then be recovered by the receiver RCD without said receiver RCD having to map precisely, with respect to time, the received pulse sequences.

To this end, the receiver RCD includes signal detection means DEC intended to detect and, if necessary, to demodulate incoming signals Tsg, such a detection being performed by computing at least one detection value representative of an amount of power carried by a received signal and to compare said detection value to at least one predetermined threshold value. As will be explained hereinafter, the result of such a comparison will automatically enable to differentiate an actually transmitted signal Tsg from noise generally affecting the related communication channel.

Figure 2:
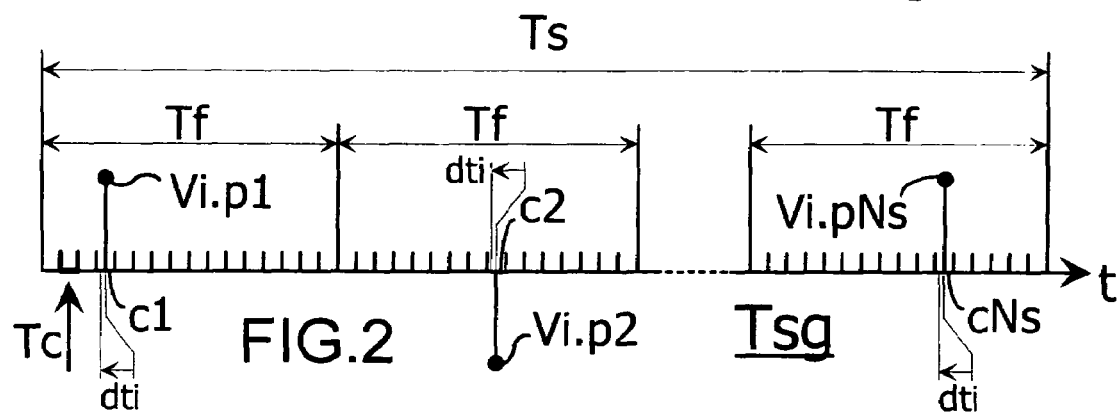
FIG. 2 is a chronogram depicting a pulse sequence constituting a carrying signal transmitted in such a telecommunication system.

FIG. 2 depicts a possible embodiment of a transmitted signal Tsg in the form of a chronogram, according to which each pulse sequence has a total duration duration Ts divided into time windows having each a duration Tf, each time window being sub-devided into time chips Tc, a single time chip within each window being intended to enclose a pulse pj (for j=1 to Ns), which single time chip is identified by means of a chip number cj. The transmitter of this transmitted signal Tsg will thus be identified by a signature Sg=(c1, c2 ... cNs) jointly formed by all above-mentioned chip numbers cj (for j=1 to Ns), which signature Sg is in itself quite sturdy and may thus be reliably and accurately communicated to all potential receivers.

In this particular embodiment of the invention, each pulse pj (for j=1 to Ns) belonging to the pulse sequence shown in this picture has been multiplied by a same integer value Vi representative of a symbol to be carried by said pulse sequence, in the form of the power carried by this sequence, the reference "i" being indicative of a reference number allocated to the pulse sequence under consideration.

Furthermore, the pulses pj (for j=1 to Ns) are multiplied by values αj which are randomly chosen equal to +1 or −1 in the course of the symbol encoding step, so that in the example shown here, the second pulse p2 is negative.

Such a random distribution of positive and negative pulses, which does not affect the information carried by said pulses because said information is related to a square form of said pulses, allows to prevent appearance of high-amplitude peaks in the spectral domain, which peaks could interfere with equipment not included in the telecommunication system. Such frequency interference should be limited as a rule, and is targeted by a European Commission Directive 83/336 CEE, as well as by regulation of the USA's Federal Communications Commission.

All pulses pj (for j=1 to Ns) of the pulse sequence shown here may additionnally be submitted to a time jitter dti in the course of the symbol encoding step.

This time-jitter, introduced by time-delaying means, will be kept small with respect to a delay spread induced by a communication channel through which the modulated signal will be transmitted. The delay spread may have, for example, a value of 100 nanoseconds. Such a time-jitter won't affect the information carried by each pulse sequence, and mainly adds an optional degree of flexibility to the modulation scheme according to the invention.

The transmitted signal Tsg may thus be expressed in the following form:

$$Tsg(t) = \sum_{i,j} Vi \cdot \alpha j \cdot pj(t - cj - j \cdot Tf - dti)$$

Figure 3:
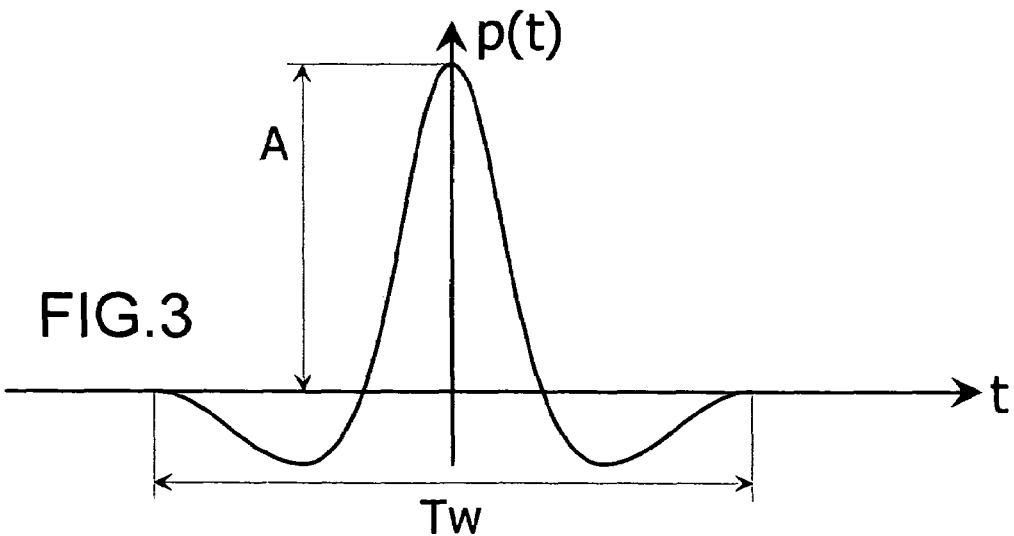
FIG. 3 is a chronogram depicting a pulse model which may be used for generating such a sequence.

FIG. 3 is another chronogram which depicts a possible shape p(t) which may be chosen for constituting the above-mentioned pulses. Pulses pj(t) (for j=1 to Ns) of a same sequence may have different shapes, provided that they all have essentially a same width and carry a same quantity of energy. All pulses pj(t) (for j=1 to Ns) belonging to a same sequence may, however, have a same shape such as the shape p(t) depicted here, which is defined as a derivative of the second order of a Gaussian function, which may be expressed mathematically as $p(t)=A \cdot [1-4\pi(t/Tw)^2] \cdot \exp(-2\pi(t/Tw)^2)$. Other pulse shapes known to those skilled in the art may, of course, be used in this same purpose.

Figure 4:
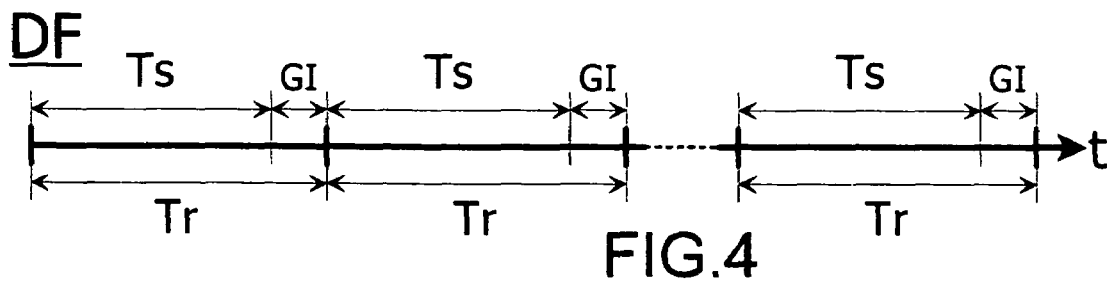
FIG. 4 is a chronogram depicting a data frame including a pluralty of pulse sequences.

FIG. 4 is yet another chronogram which depicts a dataframe DF formed by successive pulse sequences such as the one described above, each having a total duration Ts, a guard interval GI being periodically inserted between two such sequences in order to prevent alteration of a given sequence by a following one, which alterations coud be caused, for example, by intermodulation products between said pulse sequences. This dataframe DF is thus constituted by successive frames having each a duration Tr, whith Tr=Ts+GI, and including each a pulse sequence as described above.

Figure 5:
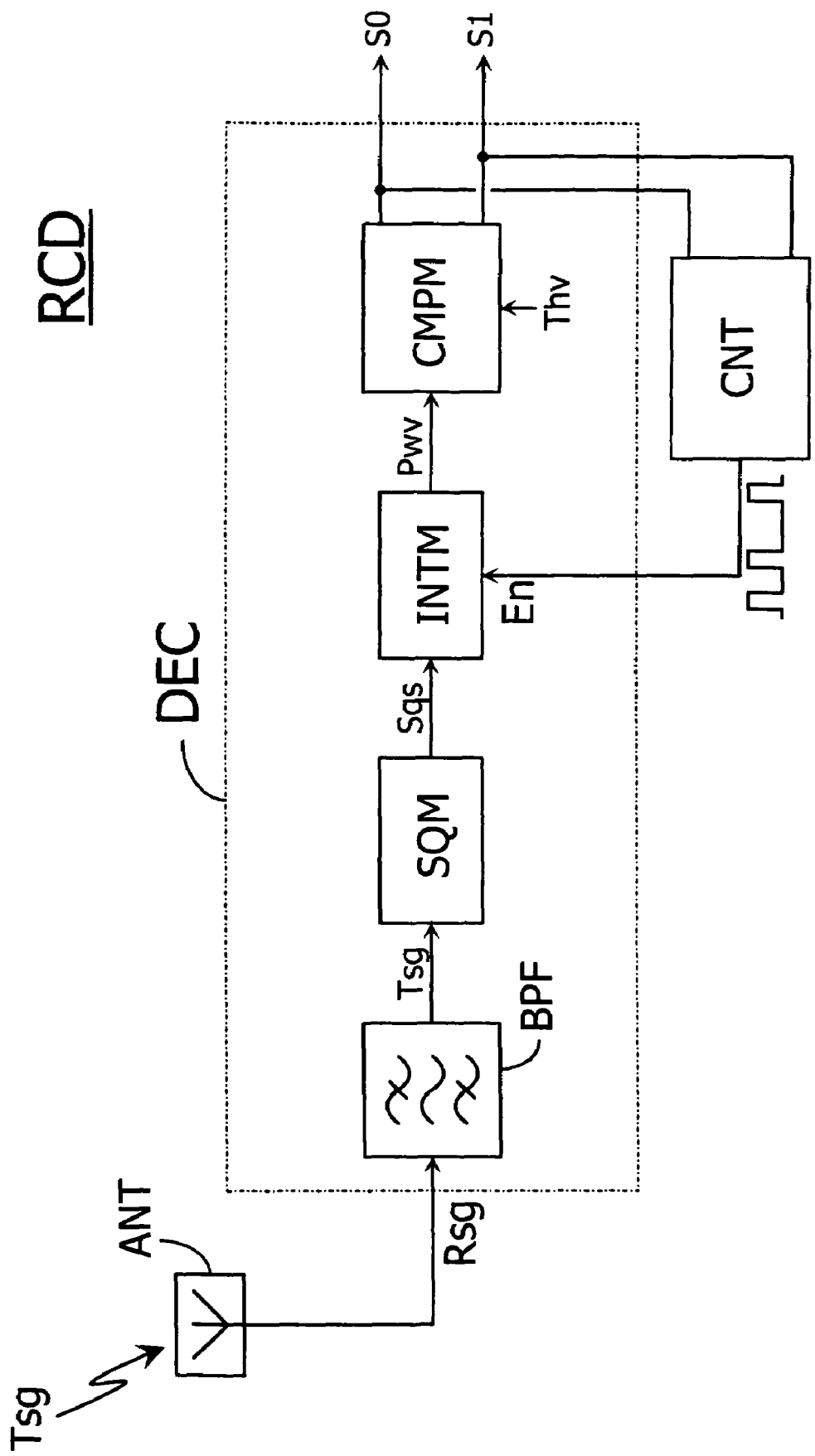
FIG. 5 is a block diagram depicting signal detection means included in a receiver in which a variant of the invention is embodied

FIG. 5 depicts signal detection means DEC included in a receiving device RCD according to a specific embodiment of the invention, which receiving device RCD also includes an antenna device ANT intended to receive a transmitted signal Tsg. In the embodiment of the invention depicted here, the signal detection means DEC include a band-pass filter PBF intended to isolate the bandwidth used for transmitting said signal Tsg, and a squaring module SQM connected to the band-pass filter BPF. This squaring module SQM is intended to receive a received signal Rsg delivered by the antenna device ANT, and to deliver a square signal Sqs constituted by a square of said received signal Rsg.

The signal detection means DEC further include an integrating module INTM, connected to the squaring module SQM and intended to deliver a detection value Pwv representative of an amount of power carried by the received signal Rsg. This detection value Pwv will then be computed as the integral, over a given integration duration defined by an enabling signal En, of the square signal Sqs delivered by the squaring module SQM.

The signal detection means DEC also include a comparing module CMPM, connected to the integrating module INTM and intended to compare the detection value Pwv to be delivered by said integrating module INTM with a predetermined threshold value Thv.

The actual presence of a pulse sequence within the received signal Rsg will thus be identified in a very straightforward manner, according to a simple decoding grid which may be expressed as follows:

If Pwv<Thv, no pulse sequence has been detected within the received signal Rsg, which is, in this embodiment, indicated by an active state featured by a first result signal S0; and If Thv<Pwv, a pulse sequence has been detected within the received signal Rsg, which is, in this embodiment, indicated by an active state featured by a second result signal S1.

As already explained above, in this particular embodiment of the invention, the integrating module INTM is only activated during active states of the enabling signal En, for example a logic level "1" which may control an activation transistor switch of a power source of said integrating module INTM. The shape of the enabling signal thus defines an integration pattern, and is adapted so as to include one or more series of time windows whose respective positions are defined by chip numbers of an expected pulse sequence, said time windows having a number and/or a width which will have been tuned in order to compensate for communication conditions currently affecting the wireless link through which the received pulse sequence Rsg has been transmitted. Such a tuning is to be performed according to a predetermined tuning scheme of which an example will be described hereinafter, and will be carried out in this example by a controller CNT comprising an integration cycle counter which is not shown here, the controller CNT being kept informed of the rsults of each integration cycle by a monitoring of one or both of the result signals S0 and S1.

The controller CNT may further include monitoring means (not shown) for monitoring the number of changes applied to the number and/or a width of the above-described time windows, so as to stop the execution of the signal detection and/or re-start said execution on the basis of initial settings once a given maximal number of changes will have been reached, which maximal number may itself be dynamically tunable.

Various methods may be used by those skilled in the art for defining and computing the threshold value Thv, which should preferably take into account a non-linear processing to be performed in the course of the signal detection step, which will involve specific statistical models of unquantifiable parameters such as thermal noise, interference cause by other transceivers, etc.

The squaring module SQM may be formed by a Gilbert cell fed with identical input signals. The integrating module INTM may be formed by an operational amplifier provided with an RC feedback. The comparing module CMPM may be formed by an operational amplifier intended to receive the detection value Pwv and the threshold value Thv. The signal detection means DEC may thus be formed by off-the-shelf analog circuits, which analog circuits are known for their high processing speed and do not require any sampling, as opposed to digital solutions, which will enable to further reduce the processing power and the time required for performing a signal detection step according to this embodiment of the invention.

Figure 6:
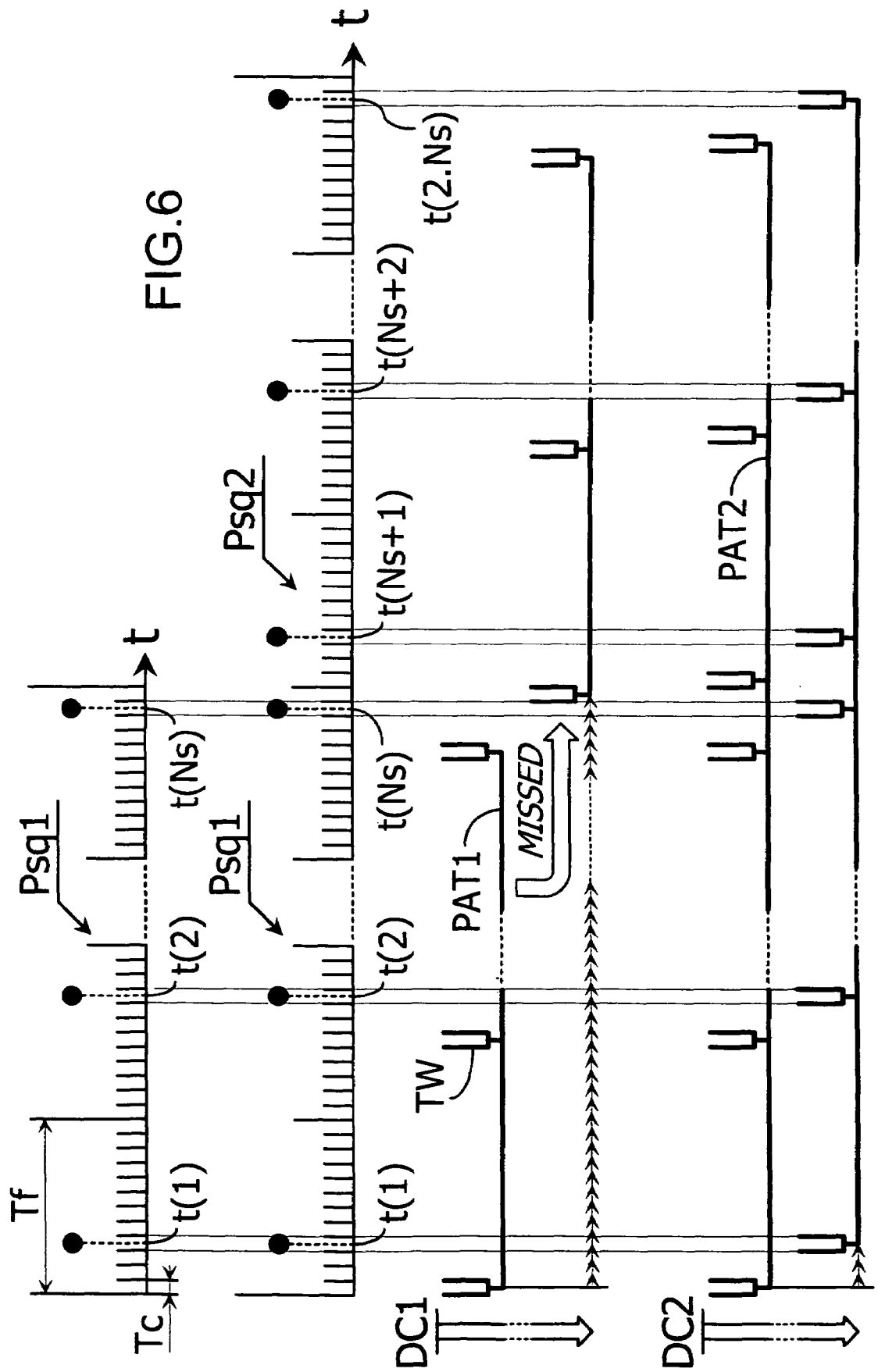
FIG. 6 is a series of chronograms depicting an embodiment of an automatic tuning step intended to adjust a time duration during which an integration of a received signal is to be carried out according to a first variant of the invention.

FIG. 6 shows how a method according to a first variant of the invention may actually be carried out in practice. In the example depicted here, at least a first and a second identical pulse sequences Psq1 and Psq2 are successively transmitted in order to enable a receiver to synchronize itself on one of said reference pulse sequences Psq1 and Psq2. During the signal detection step depicted here, a first detection pattern PAT1 including Ns time windows TW is generated by the receiver, each time window TW being centered on a predetermined instant t(1), t(2) ... (Ns) which is already known to the receiver from a prior knowledge of the signature of the transmitter of the pulse sequences Psq1 and Psq2, which signature will have been communicated to the receiver beforehand. As explained hereinbefore, the receiver will perform a first integration cycle DC1 of the received signal over successive detection patterns, all identical to the first detection pattern PAT1 and, in this example, time-shifted with respect to each other by a duration equal to the width of a time chip Tc. In the course of each integration performed over one of these patterns, a detection value is computed and subsequently compared to a predetermined threshold value. In the situation depicted here, the first detection cycle will reach its end when all possible beginnings of the transmitted pulse sequence Psq1, which would then correspond to a pulse occuring at instant t(1), will have been covered by each first window of each time-shifted detection pattern PAT1 without said pulse sequence Psq1 having been detected because the overall duration of the integration time used during this first integration cycle DC1 was too small in this example. The number of the time windows TW to be included in the detection pattern must thus be increased before a second cycle DC2 of successive integrations is performed.

In the specific embodiment of the invention depicted here, a second detection pattern PAT2 is generated for this purpose, simply by putting together two detection patterns such as the pattern PAT1 used in the previous integration cycle, which will have for immediate effect a doubling of the time duration over which the received signal will be integrated. The second detection pattern PAT2 thus includes 2.Ns time windows, which will actually enable in this example a detection of the pulse sequences Psq1, Psq2 carried by the received signal after the second detection pattern PAT2 will have been suitably time-shifted thrice as depicted here.

By virtue of the invention, further signal detection steps and symbol decoding steps may then be carried out by directly using the second detection pattern PAT2, which has been selected as comprising a minimal number of time windows and yet offering a sufficiently large time duration for performing a significant integration, which in turn will enable to optimize the processing costs of said further signal detection and symbol decoding steps, since the computation integration time will thus be kept as low as possible while allowing a suitable detection and demodulation of forthcoming received signals.

FIG. 7 shows how a method according to a second variant of the invention may actually be carried out in practice. In the situation depicted here, an unmodulated reference pulse sequence Refsq which is to be transmitted before transmission of modulated pulse sequences in order to enable a receiver to synchronize itself on said reference pulse sequence Refsq. As explained above, though this reference pulse sequence Refsq does not carry any value to be identified by the receiver, said receiver will still carry out a signal detection step involving computation of at least one detection value by integrating the received signal and comparing this particular detection value to a minimal threshold value in order to actually detect the presence of the reference pulse sequence Refsq within the received signal.

In the detection step according to this second variant of the invention, the received signal is integrated over successive series (ST11 ... ST1Np ... ), (ST21 ... ST24) of time windows TW whose respective positions are defined by the time chips enclosing the instants of occurrence (t1, t2 ... tNs) of the pulses featured by the expected reference sequence Refsq as explained hereinbefore, said time windows TW having a width which is tunable, as will now be explained.

During a first signal integration cycle SIC1, the width of said time windows TW is set to a first value T1 and a first cycle of successive integrations of the received signal is performed over successive series of time windows (ST11 ... ST1Np ... ), which series are shifted, in this example, by an amount Tc equal to the width of a single time chip after an integration over a whole series has been completed.

These successive integrations are to be performed until the result of a given integration is found higher than a predetermined threshold value, or until all possible beginnings of a reference pulse sequence will have been covered by each first window of each series, which will indicate that no such beginning will have been found, as is the case in this first signal integration cycle SIC1, where the beginning occurring at instant t1 will have been missed because the first value T1 of the width of the time windows TW is too small for producing a significant integrated value.

In this case, the value of the width of said time windows TW is increased to a greater value T2 and a second integration cycle SIC2 is performed. This new value T2 will for example be obtained on the basis of the former value T1 by incrementing said former value T1 by a predetermined quantity, or by multiplying said former value by a predermined quantity, which predetermined quantity may be adjusted dynamically. In the example depicted here, T2=2.T1, which may be interpreted as a geometric increase of the width of the time windows TW, defined by a relation of the type Tj+1=2.Tj or as an arithmetic increase defined by a relation of the type Tj+1=T1+Tj.

As shown in this example, the doubled width T2 of the time windows TW used in the second integration cycle SIC2 is sufficient for allowing the detection of the reference pulse sequence after completion of the integration over the fourth series ST24 of the time windows TW used in this second integration cycle SIC2, which detection terminates the signal detection step and thus produces a time reference to the receiver for performing further signal detection steps. By virtue of the invention, said further signal detection and symbol decoding steps can then be carried out by using directly the same width T2 for computing corresponding detection values, which will enable to optimize the processing costs of said further signal detection and symbol decoding steps, since the integration time will thus be kept as low as possible while allowing a suitable demodulation of the received signals.

It should be noted here that a tuning of the width of the time windows TW carried out according to the second variant of the invention described hereinbefore may, in some embodiments, be advantageously combined with a tuning of the number of said time windows TW carried out according to the first variant of the invention in order to provide two degrees of freedom for performing an optimal tuning of the resulting overall integration time duration used for computing the detection value.

The invention claimed is:

1. A method for transmitting data in a telecommunication system including at least one transmitter and one receiver, comprising:
    transmitting, from said transmitter, a signal formed by at least one reference sequence including a predetermined number of pulses dispatched over a same predetermined number of time windows, each pulse of the reference sequence being enclosed within a time chip whose position within its relevant time window is defined by a chip number;
    receiving, at the receiver, the signal transmitted by the transmitter;
    computing, at the receiver, at least one detection value representative of an amount of power carried by the received signal by integrating the received signal over a time duration which is tunable; and
    comparing, at the receiver, the computed detection value to at least one predetermined threshold value,
    wherein the detection value is computed by selecting an initial number of time windows for constituting an initial detection pattern and performing an initial cycle of successive integrations of the received signal over successive time-shifted detection patterns, each integration being followed by a comparison of the resulting detection value with the predetermined threshold value, said initial cycle being carried out until a detection value is found higher than said predetermined threshold value, or until all possible beginnings of a transmitted pulse sequence will have been covered by each first window of each time-shifted detection pattern, in which case the number of the time windows to be included in the detection pattern is increased and a new cycle of successive integrations is performed.

2. A method as claimed in claim 1, wherein the detection value is computed by integrating the received signal over at least one series of time windows whose respective positions are defined by chip numbers of an expected reference sequence, said time windows having a width which is tunable.

3. A method as claimed in claim 2, wherein the width of said time windows is adapted by choosing an initial setting for said width and performing a first cycle of successive integrations of the received signal over successive shifted series of time windows, until a detection value is found higher than a predetermined threshold value, or until all possible beginnings of a reference pulse sequence will have been covered by each first window of each series, in which case the value of the width of said time windows is increased and a new cycle of successive integrations is performed.

4. A telecommunication system, comprising:
    a transmitter configured to transmit a signal formed by at least one reference sequence including a predetermined number of pulses dispatched over a same predetermined number of time windows, each pulse of the reference sequence being enclosed within a time chip whose position within its relevant time window is defined by a chip number; and
    a receiver configured to receive the signal, compute at least one detection value representative of an amount of power carried by each pulse sequence by integrating the received signal over a time duration which is tunable and compare said detection value to at least one predetermined threshold value,
    wherein the detection value is computed by selecting an initial number of time windows for constituting an initial detection pattern and performing an initial cycle of successive integrations of the received signal over successive time-shifted detection patterns, each integration being followed by a comparison of the resulting detection value with the predetermined threshold value, said initial cycle being carried out until a detection value is found higher than said predetermined threshold value, or until all possible beginnings of a transmitted pulse sequence will have been covered by each first window of each time-shifted detection pattern, in which case the number of the time windows to be included in the detection pattern is increased and a new cycle of successive integrations is performed.

5. A device intended to receive a signal formed by at least one reference sequence including a predetermined number of pulses dispatched over a same predetermined number of time windows, each pulse of the reference sequence being enclosed within a time chip whose position within its relevant time window is defined by a chip number, the device comprising:
    a detector configured to compute at least one detection value representative of an amount of power carried by each pulse sequence by integrating the received signal over a time duration which is tunable, and compare said detection value to at least one predetermined threshold value, wherein the detection value is computed by selecting an initial number of time windows for constituting an initial detection pattern and performing an initial cycle of successive integrations of the received signal over successive time-shifted detection patterns, each integration being followed by a comparison of the resulting detection value with the predetermined threshold value, said initial cycle being carried out until a detection value is found higher than said predetermined threshold value, or until all possible beginnings of a transmitted pulse sequence will have been covered by each first window of each time-shifted detection pattern, in which case the number of the time windows to be included in the detection pattern is increased and a new cycle of successive integrations is performed.

* * * * *